United States Patent [19]
Kanno

[11] Patent Number: 5,555,857
[45] Date of Patent: Sep. 17, 1996

[54] FLUID LEVEL INDICATOR SYSTEM

[75] Inventor: Isao Kanno, Hamamatsu, Japan

[73] Assignee: Sanshin Kogyo Kabushiki Kaisha, Hamamatsus, Japan

[21] Appl. No.: 447,898

[22] Filed: May 23, 1995

[30] Foreign Application Priority Data

May 23, 1994 [JP] Japan .................................. 6-108071

[51] Int. Cl.⁶ .............................. F01M 1/00; G01F 23/20
[52] U.S. Cl. ................................. 123/73 AD; 73/290 R; 123/335; 123/196 S; 340/618
[58] Field of Search ........................... 123/73 AD, 196 S, 123/333, 335; 184/103.1; 73/290 R, 293; 340/618, 620

[56] References Cited

U.S. PATENT DOCUMENTS

| | | | |
|---|---|---|---|
| 4,403,578 | 9/1983 | Iwai et al. | 123/73 AD |
| 4,572,120 | 2/1986 | Matsumoto | 123/196 S |
| 5,428,348 | 6/1995 | Gault | 340/618 |

Primary Examiner—Tony M. Argenbright
Attorney, Agent, or Firm—Knobbe, Martens, Olson & Bear

[57] ABSTRACT

A system for providing an indicator light operated by a fluid level sensor, including a power source providing the voltage to a first node, a first LED and a first circuit branch connecting the first node to ground, a voltage dropping component in the first circuit branch, a second circuit branch including a second LED connected to the first node in parallel with the first LED, and a normally open first fluid level switch that can close to connect the second circuit branch to ground. The sum of the turn on voltage of the first LED and the voltage drop across the voltage dropping component when the first LED is on is greater than the voltage drop from the first node to ground through the second LED when the first switch is closed, so that the first LED is normally on when the first switch is open, and the second LED is on and the first LED is off when the first switch is closed. The first LED is preferably a system operation light for a watercraft lubrication system and the second LED is a caution or warning light indicating that lubricating oil levels have fallen below a predetermined point.

10 Claims, 3 Drawing Sheets

FLUID LEVEL INDICATOR SYSTEM

FIELD OF THE INVENTION

The present invention relates to a fluid level indicator system for vehicles, and in particular, to indicator lights for use in watercraft having a two-cycle engine. The lights preferably indicate the oil levels in one or more two-cycle oil tanks.

BACKGROUND OF THE INVENTION

Two-cycle engines are widely used in utility and recreational vehicles, such as motorcycles and outboard engines. Injection systems for mixing lubricating oil with fuel have simplified the fueling process. Such injection systems avoid the necessity of premixing fuel and oil.

One major innovation in lubricant delivery systems for outboard motors is the use of two lubricating oil tanks: a first, oil delivery tank mounted on the engine to provide immediate availability of oil during startup and operation; and a second, larger remote tank for replenishing the smaller, motor-mounted tank. Such systems are disclosed, for example, in U.S. Pat. No. 4,403,578. An improved lubrication delivery system is disclosed in U.S. Pat. No. 4,572,120. This patent discloses an automated system, in which the lubricating oil level in the motor-mounted delivery tank is sensed by a level sensing switch. When the oil level in the delivery tank falls to a predetermined point, a pump is actuated to move oil from the larger, remote-mounted storage tank to replenish the delivery tank.

Although such systems reduce the bother associated with supplying lubricating oil to two-cycle motors, it is nevertheless important to keep the operator informed of the status of the lubrication system. Lubrication failures, of course, can result in major engine damage.

For this reason, U.S. Pat. No. 4,572,120 includes a status light system. A green, "system on" light indicates that the lubrication oil system is operating and that there is a sufficient level of lubricant in the delivery tank and the remote storage tank. A second, yellow warning light indicates that the level of oil in the storage tank is low. This allows the operator to replenish the oil supply.

Even when the oil in the remote storage tank is depleted, a properly-operating system will still have oil in the engine-mounted delivery tank. Thus, when the yellow caution light comes on, if it is not possible to replenish the oil supply, the operator at least knows that sufficient oil remains in the delivery tank to protect the engine during operation.

When the oil in the delivery tank is depleted, engine damage is eminent. Accordingly, a red warning light has been provided to indicate that the oil level in the delivery tank has fallen to a predetermined point.

The prior art system in U.S. Pat. No. 4,572,120 also provides an optional buzzer, together with an optional RPM limiter, to alert the operator to the low oil level in the delivery tank, and to conserve oil if it is necessary to operate the engine after the warning light is actuated.

The oil level indicator lights are an important part of the two-tank oil delivery system now in common use with two-cycle marine engines. There is a need to provide a system that includes such warning lights that is less expensive to construct, that provides a minimum parts count circuit, and that is more reliable in operation. These needs are addressed by the present invention.

SUMMARY OF THE INVENTION

The present invention includes a system for providing an indicator light operated by a fluid level sensor, comprising: a power source providing a voltage to a first node; a first circuit branch including a first switch connecting the first node to ground through a first LED when the first switch is closed; and a second circuit branch connecting the first node to ground through a voltage dropping element and a second LED, wherein the voltage drop in the second circuit branch when the first switch is open is greater than the voltage at the first node when the first switch is closed, such that the second LED is normally on when the first switch is open, and the first LED is on and the second LED is off when the first switch is closed. In one embodiment, the voltage dropping component is a zener diode, and the voltage drop across the zener diode is about the breakdown voltage thereof. The system may advantageously also include a third LED connecting the first node to ground through a second fluid level switch, wherein the voltage drop from the first node to ground through the third LED and the second switch is less than the sum of the turn on voltage of the first LED and the voltage drop across the voltage dropping component when the first LED is on, whereby when the second switch is closed, the third LED is on and the first LED is off.

The voltage dropping element may, for example, be a zener diode or a resistor in the second circuit branch. In one variation, there is a first resistor in the first branch circuit and a second resistor in the second branch circuit, and the value of the second resistor is greater than the value of the first resistor.

In one embodiment, the system of the present invention also includes a first two-cycle lubricating oil tank in which the first switch is situated to sense the level of oil in the first tank; and a two-cycle motor operably connected to the first oil tank to receive lubricating oil therefrom. This embodiment may also include a third LED connecting the first node to ground through a second fluid level switch, wherein the voltage drop from the first node to ground through the third LED and the second switch is less than the sum of the turn on voltage of the first LED and the voltage drop across the voltage dropping component when the first LED is on, whereby when the second switch is closed, the third LED is on and the first LED is off. Preferably the system also includes a first two-cycle oil tank in which the first switch is situated to sense the level of oil in the first tank; a second two-cycle oil tank in which the second switch is situated to sense the level of oil in the second tank, the second tank connected to the first tank and adapted to receive oil therefrom; and a two-cycle engine operably connected to the second tank to receive lubricating oil therefrom. The system described above may further include an electronic RPM limiting circuit actuated by the second switch for limiting the RPM of the engine. Another option is the provision of an audible alarm responsive to actuation of the second switch. This entire system may be provided in combination with a watercraft in which the engine, the tanks, and the LEDs are located.

DETAILED DESCRIPTION OF THE INVENTION

Figure 1:
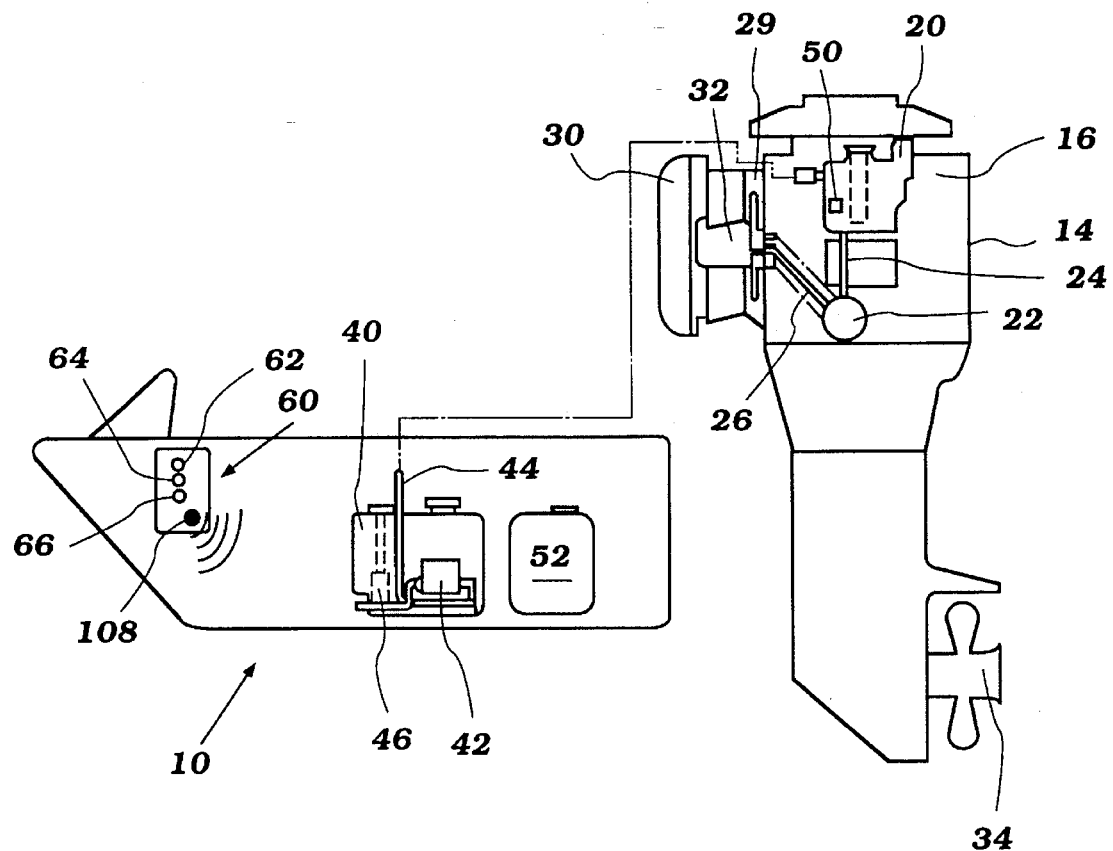
FIG. 1 is a schematic representation of a boat that includes a two-tank lubricating oil system and an indicator light assembly of the present invention.

Referring first to FIG. 1, a watercraft 10 is provided by the present invention, having a motor 14 for propulsion thereof. The motor 14 may advantageously be an outboard motor (although inboard and jet-drive motors are also contemplated). The motor 14 includes a power head 16, comprising a two-stroke engine.

A delivery tank 20 is provided in the power head 16, preferably at the top of the power head 16. The delivery tank 20 holds lubricating oil which is mixed with the fuel as is conventional for lubricating a two-cycle engine.

A lubricant pump 22 receives lubricating oil from the delivery tank 20 through a conduit 24. The lubricant pump 22 delivers lubricating oil under pressure through one or more conduits 26 into one or more intake manifolds 29. If the power head 16 includes multiple cylinders, a separate conduit 26 is provided for each intake manifold 29 that serves the respective cylinder.

The motor 14 includes other such standard components as an air delivery system 30 providing combustion air through a carburetor 32. The output power of the power head 16 is provided to a propulsion mechanism 34, which can be a propeller, a jet-drive, or the like.

Remotely located from the relatively small delivery tank 20 is a relatively large oil storage tank 40. The oil storage tank 40 is typically located in the hull of the watercraft 10. Lubricant is delivered from the storage tank 40 by a transfer pump 42, and flows through an oil line 44 to replenish the delivery tank 20 as necessary. A float switch 46 is provided in the storage tank 40 for sensing the oil level in that tank. The float switch 46 can be of any conventional design, including a mercury switch or an open-contact switch utilizing a float sliding up and down on a guide. Numerous other conventional level-sensing switches are well known in the art, and may readily be substituted for the level switches particularly disclosed herein.

A level-sensing switch or other suitable level sensor 50 is also provided in the delivery tank 20.

A fuel tank 52 of conventional design is also illustrated in FIG. 1, for supplying fuel to the motor 14.

All of the foregoing components can advantageously cooperate and function in the manner disclosed in more detail in U.S. Pat. No. 4,572,120, the disclosure of which is incorporated by reference.

Of particular interest in the present invention is an indicator light assembly 60. This indicator light assembly 60 includes a "system on" light 62, a caution light 64, and a warning light 66. The system on light 62 is preferably a green light emitting diode (LED). This light indicates that the two-tank lubricant delivery system previously described is operational and that power is supplied to the indicator light circuits.

The caution light 64 is preferably a yellow LED. The caution light 64 comes on when the lubricating oil level in the storage tank 40 has fallen to a predetermined point. This predetermined point preferably indicates that the storage tank 40 is more than half empty, preferably that it is 60%, 70%, or 80% empty, and more preferably that it is 85%, 90% or 95% empty.

The warning light 66 provides an indication of the oil level in the delivery tank 20. The warning light 66 is preferably a red LED. It is actuated when the oil level in the delivery tank 20 falls below a predetermined point; for example, when the tank is at least 50%, 60%, 70%, 80%, or 90% empty.

Figure 2:
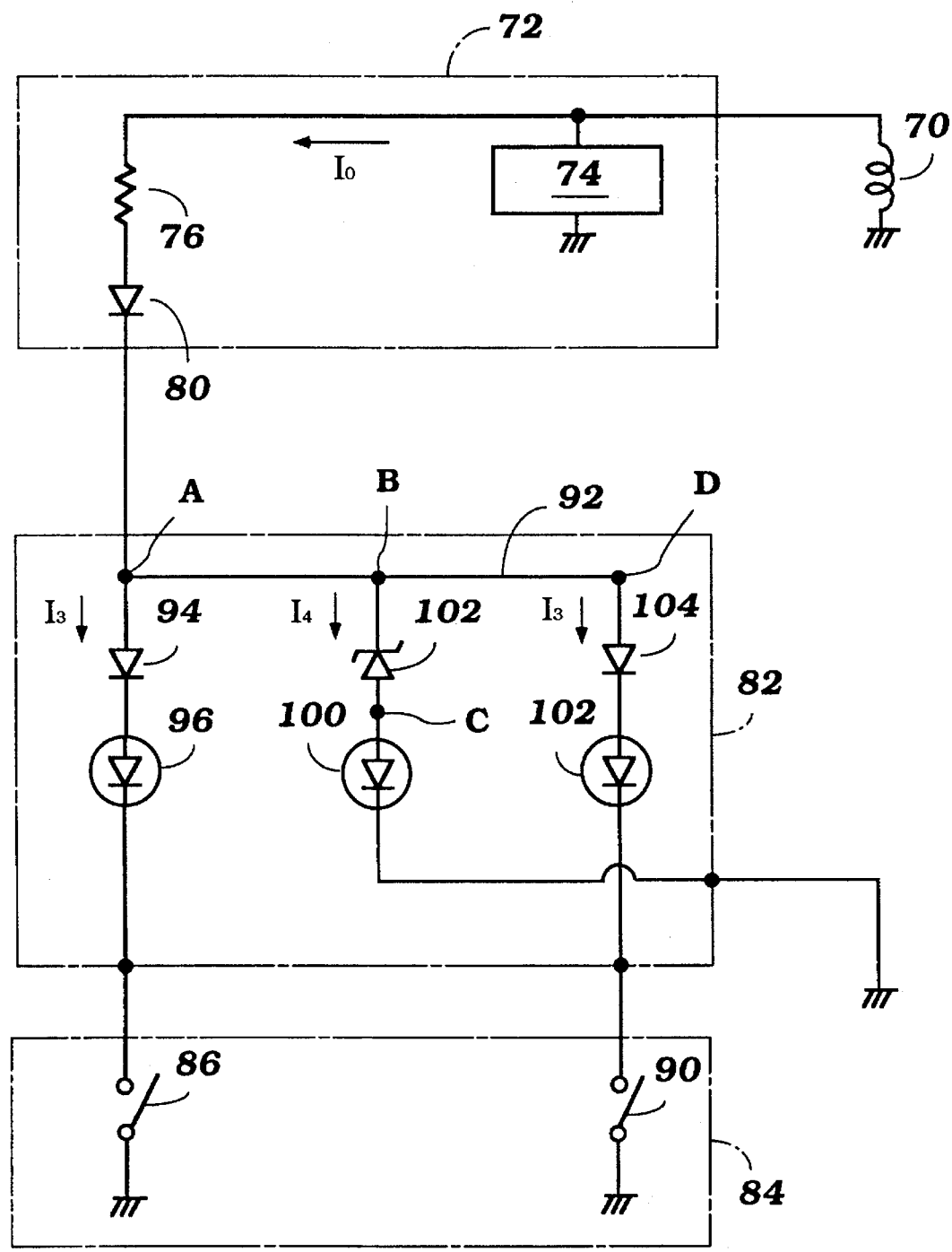
FIG. 2 is a schematic circuit diagram of one embodiment of the indicator light circuit of the present invention.
Figure 3:
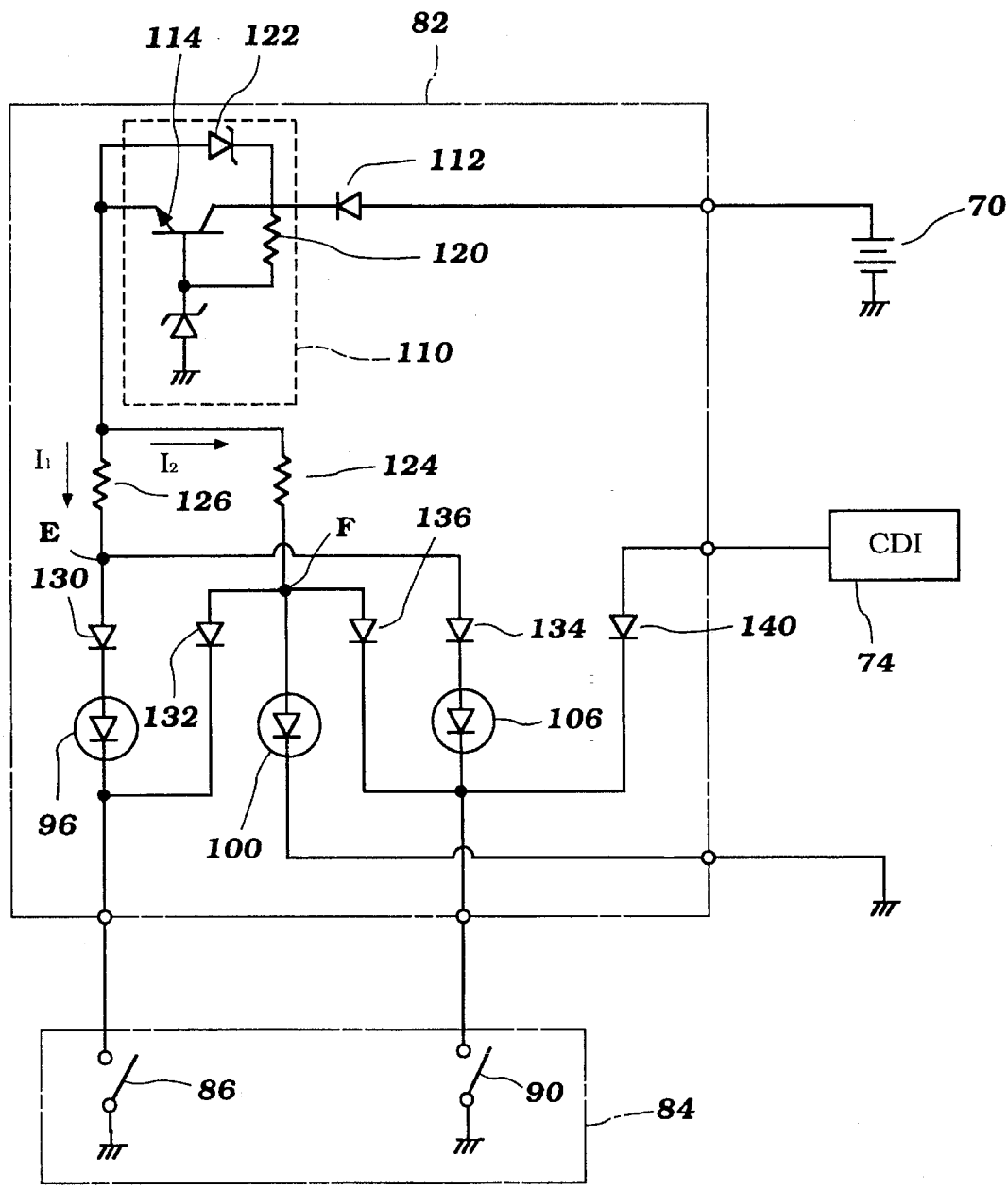
FIG. 3 is a schematic circuit diagram of a second, alternative indicator light circuit of the present invention.

The indicator light system of the present invention is illustrate schematically in FIGS. 2 and 3. With reference first to FIG. 2, electrical power is provided from a power source 70, which may typically be a battery, a stator coil, a generator or an alternator. Power from the power source 70 is delivered by a power supply circuit 72 that typically includes a capacitive discharge ignition (CDI) module 74, a power supply resistor 76 or other source of impedance, and one or more power supply rectifiers 80, including rectifying diodes and other similar rectifiers used in power supply circuits 72 of conventional design.

The power supply circuit 72 provides DC current $I_0$ to an indicator light circuit 82, which is controlled by a level-sensing circuit 84. The level-sensing circuit 84 includes a supply tank level switch 86 and a delivery tank level switch 90. The supply tank level switch 86 and the delivery tank level switch 90 are normally open switches; i.e., when the lubricating oil level in the delivery tank 20 and the storage tank 40 are satisfactory, the level switches 86 and 90 are open.

The operation of the indicator light circuit 82 will now be described in greater detail. In normal operation, the current $I_0$ is supplied by the power supply circuit 72 to a power bus 92 in the indicator light circuit 82. The power bus 92 includes three nodes A, B, and D, so that the power bus 92 may be defined as A-B-D. The power bus 92 is connected to ground through three possible circuit branches. The first, carrying current $I_3$, includes a diode 94 and an LED 96 which is the caution light 64, together with the supply tank level switch 86.

The second circuit branch connects node B to ground through an LED 100, which is the system on light 62, and a voltage dropping component 102 which in this figure is a blocking zener diode. The circuit branch B-ground carries a current 14.

The third circuit branch, D-ground, includes a diode 104 and an LED 106, which corresponds to the warning light 66. This third circuit branch B-ground is switched by the delivery tank level switch 90. An audible alarm 108, such as a buzzer, can be connected in parallel to the warning LED 106 (see FIG. 1).

In normal operation, switches 86 and 90 are open and the only current flowing is $I_4$ through the system on LED 100 and the zener diode 102. The zener diode 102 acts as a voltage dropping component, so that the voltage at node B is equal to the sum of the voltage drop across the zener diode 102 and that across the system on LED 100. The voltage at a node C, between the LED 100 and the zener diode 102, is equal to the turn on voltage or illumination voltage of the LED 100, and the voltage at node B is equal to the voltage at C plus the breakdown voltage of the zener diode 102.

When either switch 86 or switch 90 (or both) is closed, the voltage in bus 92 (nodes A, B and D) drops. If switch 86 is closed, for example, the voltage at node A (and at nodes B and D) is equal to the voltage drop across the diode 94 and the caution LED 96. Because the sum of the voltage drop across the diode 94 and the caution LED 96 is less than the sum of the breakdown voltage of the zener diode 102 and the turn on voltage of the system on LED 100, the zener diode 102 is not conductive and the LED 100 is turned off. The same result obtains if switch 90 is closed, or if both of switches 86 and 90 are closed. Thus, the three-light indicator circuit 82 includes only six components in addition to the switches 86 and 90, and the system on LED 100 automatically switches off when either the caution LED 96 or the warning LED 106 is on because sufficient voltage to light the system on LED 100 is no longer available, as a result of the presence of the voltage dropping component 102 (here a zener diode) is insufficient to light the system on LED 100. This all done without logic circuitry and without transistors or other SCRs in the indicator light circuit 82.

FIG. 3 illustrates an alternative circuit, in which a dropping resistor is used as a voltage dropping component in place of the zener diode 102.

With reference now to FIG. 3, the indicator light circuit 82 receives power from a power source 70 that, for purposes of illustration, is a battery. Power is delivered from the power source 70 into a regulator circuit 110 through a protecting diode 112. The regulator circuit 110 can be of any suitable design. For purposes of illustration, the regulator circuit includes a transistor 114 in which the collector is connected to the power source 70, a zener diode 116 is connected between the base and ground, and receives power from the power source 70 through a resistor 120, thus providing a constant, regulated voltage to the base, and thus provides a constant current through the resistor 120. A protective zener diode 122 connecting the collector of the transistor 114 to the emitter protects the transistor against current spikes and/or provides a constant voltage across the transistor 114. The regulated current from the regulator 110 is delivered to LED 100 through a dropping resistor 124, providing a circuit path for current $I_2$ to ground. When switches 86 and 90 are open, the voltage at node F (between dropping resistor 124 and LED 100) is defined, at a minimum, by the turn on voltage of the system on LED 100. Thus, LED 100 is ordinarily lit.

As in FIG. 2, the caution LED 96 and the warning LED 106 are wired in parallel with LED 100 through switches 86 and 90, respectively, to provide a path for current $I_1$ to ground. Current $I_1$, in supplying LEDs 96 and/or 106, passes through resistor 126, which is in parallel with the dropping resistor 124. When switch 86 is closed, current $I_1$ flows from the regulator 110 through the resistor 126 to node E and thence through diode 130, LED 96, and switch 86 to ground. The resistor 126 is preferably smaller than the dropping resistor 124; thus, the voltage drop across resistor 126 is less than the voltage drop across resistor 124, so that the voltage at node F (between the dropping resistor 124 and the system on LED 100) is less than the voltage at voltage at node E (between the resistor 126 and the caution LED 96). When switch 86 closes to illuminate LED 96, the voltage at node F (i.e., the voltage supplied to LED 100) is less than the turn on voltage of LED 100. Accordingly, LED 100 is off when switch 86 is closed. To further ensure that the voltage at node F is below the turn on voltage of the system on LED 100, it is advantageous to also connect node F to switch 86 through a diode 132. This clamps the voltage at node F at the voltage drop of the conventional diode 132, which is typically 0.7 volts, well below the typical two-volt turn on voltage of an LED such as LED 100.

As was previously mentioned, current $I_1$ going from the regulator circuit 110 through the resistor 126 supplies node E, which in turn supplies current to both LED 96 and LED 106. When switch 90 closes, node E is connected to ground through switch 90, LED 106, and a diode 134. A diode 136 is connected to node F in parallel with diode 132. Diode 136 connects node F to ground through switch 90, thereby clamping node F at the voltage drop across diode 136 when switch 90 is closed. As described in connection with diode 132, this ensures that the voltage at node F is below the turn on voltage of the system on LED 100 when switch 90 is closed.

When the delivery tank level switch 90 closes, the oil level in the delivery tank is below a predetermined normal operating level. If the motor 14 continues to be operated, the oil in the delivery tank 20 will eventually be depleted and engine damage will result. For this reason, an RPM limiter function is advantageously provided. Suitable RPM limiter circuitry is disclosed in U.S. Pat. No. 4,572,120. Such circuitry, contained in CDI 74, is actuated by grounding a line from CDI 74 through a diode 140 when switch 90 closes. This will permit the engine to run, at reduced RPM, so that the user can continue to operate the boat for some time while conserving lubricating oil due to reduced RPMs.

Although the foregoing circuitry has been described in the context of a particular preferred embodiment, it will be understood that many equivalent modifications are possible. For example, the voltage dropping components 102 and 124 need not necessarily be zener diodes and resistors. Similarly, in the branch circuits containing switches, diodes, and LEDs, the relative location in such branch circuits of those components can be varied without affecting the operation of the circuit. Finally, although the present indicator light system has been described in the context of lubricating oil level sensors in a two-cycle watercraft, it will be understood that the present invention is applicable to other types of vehicles. In addition, although the indicator circuitry has been described herein in connection with level sensing applications, involving lubricating oil, it will be understood that other level sensing applications are also contemplated, as are indicating circuits outside of the level sensing field.

In view of the foregoing, it is clear that the modifications discussed above, together with other modifications readily apparent to those of skill in the art, can be made without departing from the spirit of the present invention. Accordingly, it is intended that the present invention be accorded the full lawful scope of the claims that follow.

What is claimed is:

1. An system for providing an indicator light operated by a fluid level sensor, comprising:

a power source providing a voltage to a first node;

a first circuit branch including a first switch connecting said first node to ground through a first LED when said first switch is closed; and a second circuit branch connecting said first node to ground through a voltage dropping element and a second LED, wherein the voltage drop in said second circuit branch when said first switch is open is greater than the voltage at said first node when said first switch is closed, such that said second LED is normally on when said first switch is open, and said first LED is on and said second LED is off when said first switch is closed.

2. The system of claim 1, wherein said voltage dropping component is a zener diode, and the voltage drop across said zener diode is about the breakdown voltage thereof.

3. The system of claim 1, further comprising:

a third LED connecting said first node to ground through a second fluid level switch, wherein the voltage drop from said first node to ground through said third LED and said second switch is less than the sum of the turn on voltage of the first LED and the voltage drop across said voltage dropping component when said first LED is on, whereby when said second switch is closed, said third LED is on and said first LED is off.

4. The system of claim 1, further comprising:

a first two-cycle lubricating oil tank in which said first switch is situated to sense the level of oil in said first tank; and a two-cycle motor operably connected to said first oil tank to receive lubricating oil therefrom.

5. The system of claim 4, further comprising:

a third LED connecting said first node to ground through a second fluid level switch, wherein the voltage drop from said first node to ground through said third LED and said second switch is less than the sum of the turn on voltage of the first LED and the voltage drop across said voltage dropping component when said first LED is on, whereby when said second switch is closed, said third LED is on and said first LED is off;

a first two-cycle oil tank in which said first switch is situated to sense the level of oil in said first tank;

a second two-cycle oil tank in which said second switch is situated to sense the level of oil in said second tank, said second tank connected to said first tank and adapted to receive oil therefrom; and a two-cycle engine operably connected to said second tank to receive lubricating oil therefrom.

6. The system of claim 5, further comprising:

an electronic RPM limiting circuit actuated by said second switch for limiting the RPM of the engine.

7. The system of claim 5, further comprising an audible alarm responsive to actuation of said second switch.

8. The system of claim 5, further comprising a watercraft in which said engine, said tanks, and said LEDs are located.

9. The system of claim 1, wherein said voltage dropping element is a resistor in said second circuit branch.

10. The system of claim 9, wherein there is a first resistor in said first branch circuit and a second resistor in said second branch circuit, and the value of said second resistor is greater than the value of said first-resistor.

* * * * *